United States Patent [19]
Thompson

[11] 3,749,382
[45] July 31, 1973

[54] CROP DEHYDRATOR AND METHOD

[76] Inventor: Stanley P. Thompson, 2718 Osborn Rd., Topeka, Kans. 66614

[22] Filed: Apr. 19, 1971

[21] Appl. No.: 135,068

[52] U.S. Cl................... 432/58, 432/86, 432/103
[51] Int. Cl............................................. F27b 7/00
[58] Field of Search............................ 263/32, 21 A

[56] References Cited
UNITED STATES PATENTS
2,319,673   5/1943   French.............................. 263/32 R
2,952,452   9/1960   Kopf................................... 263/32 R

*Primary Examiner*—John J. Camby
*Attorney*—Bradley and Wharton

[57] ABSTRACT

A method and apparatus for dehydrating agricultural crops utilizes the product gases from the combustible dryer fuel as the medium for pneumatically conveying the crop through the drying zone. A horizontally disposed drying drum has an inlet at one end and an outlet at the opposite end. The inlet communicates with the fuel source and the outlet is coupled with a cyclone separator for removing the dried crop from the conveying medium. Structure disposed at the top of the separator returns the combustion gases to the drying drum. A blower fan at the outlet end of the drum assures a continuous flow of gases and fresh air throughout the apparatus. By utilizing the combustion gases as the conveying medium, the oxygen content within the drum is reduced and the combustion of foreign contaminants and dry, thin, particles of the crop is minimized.

7 Claims, 6 Drawing Figures

PATENTED JUL 31 1973 3,749,382

INVENTOR.
Stanley P. Thompson
BY Bradley and Wharton
Attorneys

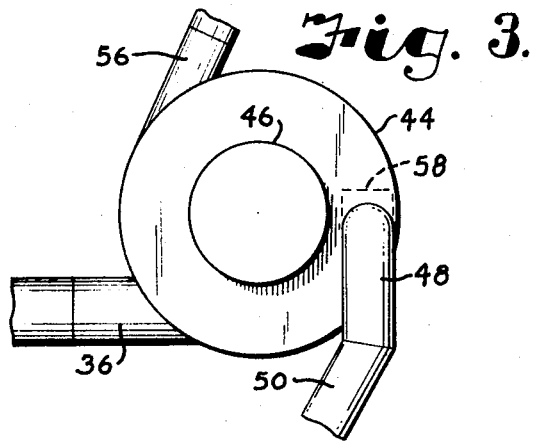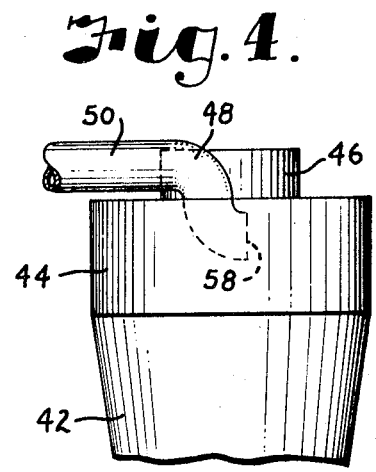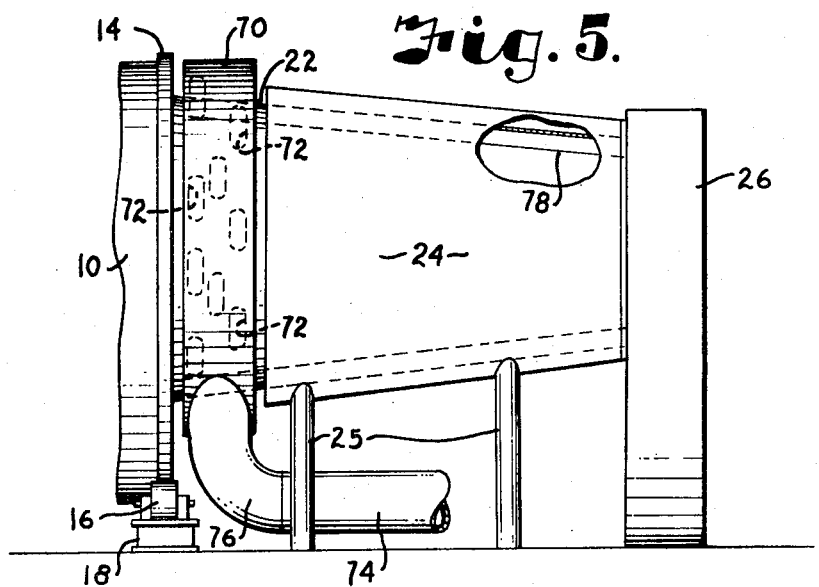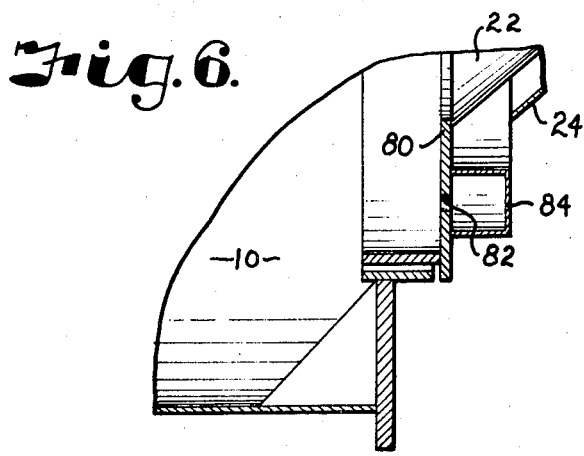

CROP DEHYDRATOR AND METHOD

This invention relates to improvements in dehydrating apparatus.

It has long been the practice in the processing of agricultural crops such as alfalfa to remove excess water from the alfalfa prior to processing of the same. This requires that the alfalfa be passed through a large dehydrating drum wherein the temperature is raised to a relatively high level to drive off the water after which the alfalfa is normally comminuted and then pelletized. When the alfalfa is heated in the drying drum the foreign particles which are present in the crop and have a considerably lower moisture content ignite and burn. Also those particles of the alfalfa which are very thin and dry tend to ignite and burn or char for the same reasons. This burning of particles is the major source of air pollution emanating from dehydrating apparatus since the combustion is relatively incomplete and the burned particles pass out of the dehydrator and into the atmosphere. This combustion of particles is also the source of the unpleasant odor which has long been associated with alfalfa dehydrating equipment.

It is therefore the primary object of the present invention to provide a method and apparatus for dehydrating a product wherein thin, dry particles present in the product to be dried do not undergo combustion and the air pollution attributable to the apparatus is thereby effectively reduced.

As a correlary to the above object, an aim of this invention is to prevent the combustion of particles in dehydrating equipment by maintaining the oxygen content of the dehydrator at a sufficiently low level so as to preclude combustion.

Still another object of this invention is to preclude combustion of particles in a dehydrator by maintaining the oxygen content at a relatively low level through the use of combustion gases from the dehydrator heat source as the medium for conveying the product to be dried through the dehydrator.

As a correlary to the above object, another object of this invention is to maintain the oxygen level within the dehydrator below 10 per cent at all times.

It is also one of the objects of this invention to provide a method and apparatus for dehydrating a product wherein the product is pneumatically conveyed through the zone can be increased without increasing the oxygen content within the dehydrator.

Still another aim of this invention is to provide a method and apparatus for dehydrating a product which will permit the dehydrating zone to be maintained at higher temperature levels than has heretofore been possible without the combustion of particles or the danger of charring the product being dried.

In the drawings:

FIG. 3 is a top plan view of the cyclone separator shown in FIG. 1 and illustrating the manner in which the various gas conduits and product lines enter the top of the separator;

FIG. 4 is a partial side elevational view of the cyclone separator illustrating the manner in which the combustion gas conduit is disposed adjacent the separator stack;

FIG. 5 is a partial side elevational view of the inlet end of the dehydrator drum and the furnace associated therewith, showing an alternative arrangement for recycling the combustion gases through the drying drum; and FIG. 6 is an enlarged partial cross sectional view of the inlet end of the dehydrator drum illustrating still another alternative arrangement for recycling the combustion gases through the drum.

Figure 1:
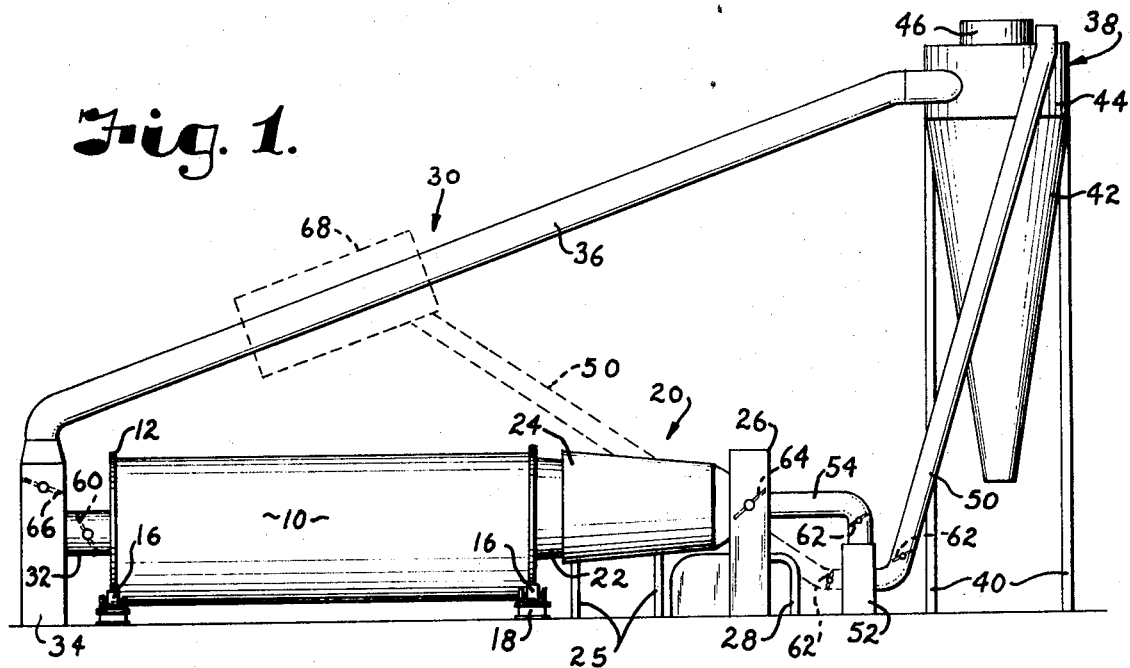
FIG. 1 is a side elevational view of a dehydrator constructed according to the present invention and coupled with a cyclone separator.

Referring initially to the preferred embodiment of the invention which is illustrated in FIGS. 1, 3 and 4, a horizontally disposed, cylindrical drying drum 10 is provided with a pair of external end flanges 12 and 14 which mount the drum for rotation upon a plurality of rollers 16. The rollers 16 are in turn supported by mounting pads 18. An appropriate drive mechanism (not shown) is coupled with the drum 10 for rotating the latter during the dehydrating a material. The drum 10 defines a drying zone and has an inlet at one end which communicates the drying zone with a heat source designated generally by the numeral 20 disposed adjacent and on the same side of the dryer as the material inlet.

The heat source 20 which is disposed immediately ahead of the material inlet includes a frustoconical configured furnace 22 which is surrounded by a circumferentially spaced shroud 24, and a blower fan which is designated by defining a combustion zone the numeral 26 disposed on the same side of drum 10 as the material inlet to the latter. The furnace 22 and the shroud 24 are supported by a pair of vertical legs 25 which are rigid with the shroud. The furnace 22 utilizes a source of combustible fuel such as natural gas which is supplied by a conduit 28.

The end of the drum 10 which is opposite the inlet end is provided with a material outlet through which the dried product passes. Structure for communicating the outlet end of the drum 10 with the opposite end of the drum end and for directing the dried product to subsequent processing stages is designated generally by the numeral 30 and includes an annular duct 32 contiguous with the outlet end of the drum 10, an exhaust fan designated by the numeral 34, and a dehydrated product delivery line 36. A cyclone separator 38 which serves as a primary collector for removing the dried product from the conveying medium is supported by a pair of upright standards 40 and includes a frustoconical portion 42 and an integral upright cylindrical portion 44 which is integral with the portion 42 at the base of the latter. A cylindrical stack 46 extends through the top of the portion 44 and down into the interior of the separator 38 to provide an exhaust outlet for the water which is driven off during the dehydrating process and converted into steam.

As best illustrated in FIG. 3, the delivery line 36 communicates with the separator 38 in tangential relationship to the portion 44 so as to assure that a "whirling motion" will be imparted to the dried product as it enters the separator. Referring additionally to FIG. 4, it is seen that an elbow provides an inlet section for a conduit 50 which extends downwardly from the top of the separator 38. The conduit 50 communicates with an auxiliary fan designated by the numeral 52, the latter being in communication with the material inlet to the drum through a duct 54.

Referring particularly to FIG. 3, a return conduit 56 communicates with the separator 38 and is also tangentially disposed relative to the portion 44. It is to be noted that the line 36 and the conduits 50 and 56 each communicate with the separator 38 at different circumferentially spaced points around the portion 44. The inlet 58 to the section 48 is slightly closer to the conduit 56 than it is to the conduit 36 for purposes to be made clear hereinafter. The elbow 48 extends down into the separator 38 as best illustrated in FIG. 4 and the inlet 58 is disposed facing away from the direction of travel of the dried product being introduced into the separator through the line 36.

Referring again to FIG. 1, first air flow control means in the form of a damper 60 is disposed in the duct 32 immediately ahead of the exhaust fan 34, and a second air flow control in the form of a damper 62 is disposed in the conduit 50 immediately ahead of the fan 52. Additional air flow control means include a damper 62 in the duct 54 ahead of the blower fan 26, a damper 64 in the housing of the fan 26, and a damper 66 in the housing of the fan 34.

In operation, natural gas is burned in the furnace 22 to produce heat and combustion gases. The combustion of the natural gas is supported by air which is drawn into the furnace between the outside of the latter and the inside of the shroud 24 by the action of blower fan 26. The fan 26 is of the squirrel cage type and is disposed to connect with the duct 54. The heat and combustion gases from the furnace 22 are directed into the drum 10 by the fan 26 and pulled in the direction of the outlet end of the drum 10 by the fan 34. An agricultural crop such as alfalfa or other product to be dried is introduced into the drum 10 through an opening in the furnace 22. The alfalfa is dehydrated within the drum 10 and is pneumatically conveyed along the length of the latter by the action of the air circulating fan 34. As the dried alfalfa is drawn through the duct 32, it is directed upwardly through the line 36 and into the separator 38.

Within the separator 38 the dried alfalfa is removed from the air stream of the conveying medium as the alfalfa gravitates to the bottom of the separator and the water removed during the dehydration process, which is converted to steam within the drum 10, is discharged through the stack 46. The alfalfa is then removed from the bottom of the separator 38 for delivery to a comminuter and subsequently to a pelleting mill.

The fan 34 must be operated at a sufficiently high rate of speed to maintain the necessary flow of air through the drum 10 to pneumatically convey the alfalfa being dried. Heretofore, the conveying medium for the product being dried has been air entering the furnace 22 through the shroud 24 or through other openings extending to the atmosphere. Because this fresh air is relatively rich in oxygen, combustion is easily supported within the drum 10 at the normal drying temperatures in the range of 250° F., and a large portion of the foreign particles which are inevitably present within the alfalfa as well as relatively thin, dry particles of the alfalfa itself have been burned at these temperatures present within the drum. A certain minimal quantity of oxygen is, of course, needed to support combustion within the furnace 22 although it has been found that the quantity of fresh air required to meet these minimal requirements is far below the quantity required to comprise the conveying medium. In the present invention, the combustion gases which are produced by the burning of the natural gas in the furnace 22 are recycled through the drum 10 via the structure 30 to comprise the medium for conveying alfalfa through the drum. Thus, the air circulating fan 34 directs the combustion gases through the line 36 and into the separator 38 contemporaneously with the dried alfalfa. Because the inlet 58 is circumferentially spaced and faces away from the delivery line 36, there is little tendency for the dried alfalfa entering the separator to be pulled into the conduit 50. On the other hand, the much lighter combustion gases which are conveyed to the separator 38 through the line 36 are drawn into the conduit 50 by the action of the auxiliary fan 52. The return conduit 56 returns residual alfalfa particles from the subsequent comminuting and pelleting operations to the separator 38 and the conveying medium within the conduit 56 is relatively rich in oxygen content. However, the conduit 56 is circumferentially spaced from the inlet 58 and directs its discharge away from the inlet. For this reason, it is preferable to locate the inlet 58 slightly closer to the conduit 56 than it is to the delivery line 36. This results in a sufficiently great stratification of the relatively rich oxygen medium from the conduit 56 and the relatively oxygen free medium from the line 36 so as to not significantly increase the oxygen content within the conduit 50. Although the auxiliary fan 52 is not essential to the recycling of the combustion gases, a sufficient pressure differential existing at the inlet 58 to accomplish recycling without the fan 52, inclusion of the auxiliary fan results in superior control of the conveying medium. By recycling the combustion gases through the conduit 50, the duct 54 and the furnace 22, to the drying drum 10, the oxygen content within the drum can be maintained below approximately 10 per cent which is not a sufficiently high oxygen content to support combustion of the particles referred to above. This permits the temperature within the drum 10 to be maintained at higher levels than has heretofore been possible thus enhancing the drying of the alfalfa and increasing the capacity of the drum while lowering the drying time.

To control the flow of the conveying medium and hence the quantity of alfalfa through the drum 10 the control damper 60 is opened or closed as may be desired. Opening of the damper 60 also increases the flow of combustion gases being recycled through the line 36 and the conduit 50 and for this reason additional dampers 62 are provided in the conduit 50 and the duct 54 for varying the flow of gases therethrough in proportion to the requirements of the system.

An alternative arrangement for the conduit 50 is illustrated in phantom in FIG. 1. In this instance, a manifold 68 would be provided in surrounding relationship to the line 36 and the conduit 50 would communicate with the manifold 68. The end of the conduit 50 opposite the manifold 68 would again communicate with the auxiliary fan 52 and a control damper 62 would be placed immediately adjacent the fan 52. With this alternative arrangement, an appropriate sized screen would be included within the manifold 68 to prevent the dried alfalfa from being pulled into the conduit 50. The combustion gases which form the conveying medium would, however, pass through the conduit 50 while the dried alfalfa would pass to the separator 38 through line 36. Operation of the dehydrating apparatus would be the same as for the preferred embodiment previously described although the extent of separation of the gases from the dried product would not be as great as with the preferred arrangement.

Figure 2:
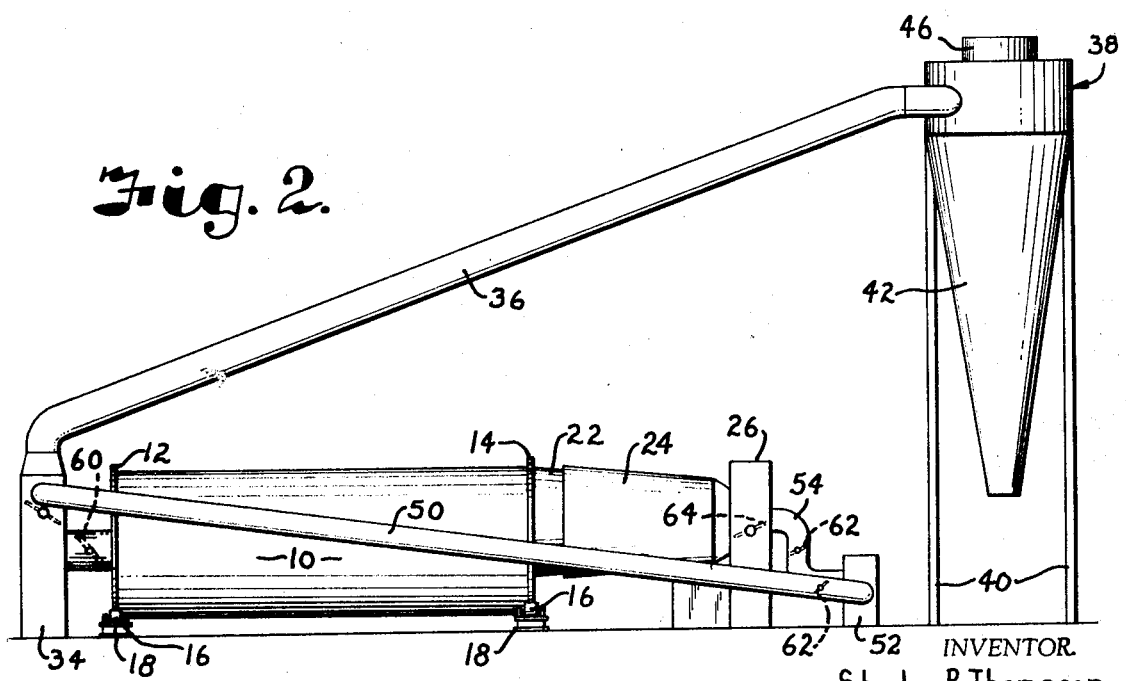
FIG. 2 is a side elevational view similar to FIG. 1 and showing an alternative arrangement of the structure for recirculating the combustion gases through the drying drum.

Another alternative arrangement for the dehydrating apparatus is illustrated in FIG. 2 wherein the conduit 50 communicates directly with one side of the exhaust fan 34 to recycle combustion gases to the opposite end of the drum 10. One end of the conduit 50 communicates with the housing of the fan 34 while the other end communicates with the auxiliary fan 52 in the same manner as described above for the alternative locations of the conduit 50. Operation of the apparatus shown in FIG. 2 is identical to that previously described for the embodiment of FIGS. 1, 3 and 4.

In FIG. 5 still another alternative form of the invention is illustrated and it is seen that disposed on the same side of the dryer as the material inlet is a combustion gas inlet manifold 70 which encircles the furnace 22 and communicates with the latter through a plurality of openings 72. An extension 74 of the conduit 50 communicates with the manifold 70 through an elbow 76. It will be appreciated that the conduit 50 can be disposed in any of the three locations described above although it is preferable to run the conduit 50 from the top of the separator 38 as shown in FIG. 1. As shown in the broken away portion of FIG. 5, the furnace 22 has a refractory lining 78 for facilitating heat transfer to the drum 10. Operation of the apparatus shown in FIG. 5 is identical to that of the preferred embodiment described above although the combustion gases which comprise the conveying medium are recycled through the inlet manifold 70 rather than through the blower fan 26 thus assuring bypassing of the combustion zone.

In still another alternative form of the invention which is illustrated in FIG. 6 of the drawings, an annular plate 80 is secured to the end of the furnace 22 which is adjacent the inlet to the drum 10. The plate 80 has a plurality of openings therein which communicate with a combustion gas inlet manifold 84. Manifestly, combustion gas inlet manifold 84 is disposed on the same side of the dryer as the material inlet to the latter. The conduit 50 can be communicated with the manifold 84 in any appropriate manner such as by an extension 74 and an elbow 76 as described for the embodiment of FIG. 5. Operation of the embodiment of FIG. 6 is identical to the operation previously described for the embodiment of FIGS. 1, 3 and 4 although the combustion gases are recycled through the drum 10 via the manifold 84 rather than through the blower fan 26 thus assuring bypassing of the combustion zone.

From the foregoing description, it will be apparent that the apparatus of the present invention provides for an effective pneumatic conveying medium which can be varied in accordance with the quantity of material being processed, but which is always sufficiently low in oxygen content to preclude combustion of foreign and other relatively dry particles within the drying zone. This substantially reduces the unpleasant odors associated with alfalfa dehydration and effectively eliminates a major source of air pollution from alfalfa dehydration equipment.

Having thus described the invention, what is claimed as new and desired to be secured by letters Patent is:

1. Dehydrating apparatus comprising:
    a dryer having a material inlet at one end and a material outlet at the opposite end;
    a furnace for said dryer disposed adjacent to and on the same side of the dryer as said material inlet and immediately ahead of the latter;
    said furnace comprising a source of combustible fuel which produces gases upon combustion and a combustion zone adjacent to said source;
    gas inlet means disposed on the same side of the dryer as said material inlet and in communication with the latter;
    means disposed externally of the dryer for directing said gases from said material outlet to said gas inlet means and bypassing said combustion zone; and
    air circulating means disposed on the same side of the dryer as said material inlet and in communication with the latter for conveying a product to be dried through the dryer whereby said gases comprise a portion of the conveying medium.

2. The invention of claim 1, wherein said apparatus is adapted for use in drying agricultural crops, and including a collector in communication with said outlet for separating the dehydrated crop from the air stream of said air circulating means, said gas directing means being disposed in communication with said separator at a location whereby said gases are recycled through the dryer free from said dried crop.

3. The invention of claim 2, wherein said separator comprises a cyclone separator and said gas directing means includes a conduit having an intake section disposed within said separator and facing away from the direction of travel of the dehydrated crop.

4. The invention of claim 3, wherein said cyclone separator includes an upper cylindrical portion and wherein is included a dehydrated product delivery line communicating said outlet with said portion, said intake section extending through said portion in circumferentially spaced relationship to said delivery line.

5. The invention of claim 4, wherein is included a return conduit for returning residual crop particles from subsequent processing operations to said cyclone separator, said return conduit communicating with said portion at a point circumferentially spaced from said intake section in the opposite direction from said delivery line.

6. The invention of claim 5, wherein the distance between said intake section and the delivery line is greater than the corresponding distance between the delivery line and the return line.

7. The invention of claim 1, said gas inlet means comprising a manifold circumscribing said dryer inlet and communicating therewith.

* * * * *